(12) United States Patent
Shiohara et al.

(10) Patent No.: US 7,747,219 B2
(45) Date of Patent: Jun. 29, 2010

(54) METHOD OF SETTING WIRELESS COMMUNICATION DEVICE

(75) Inventors: Susumu Shiohara, Nagano-ken (JP); Hitoshi Ishida, Nagano-ken (JP); Tatsuya Kiyono, Nagano-ken (JP)

(73) Assignee: Seiko Epson Corporation, Tokyo (JP)

( * ) Notice: Subject to any disclaimer, the term of this patent is extended or adjusted under 35 U.S.C. 154(b) by 1553 days.

(21) Appl. No.: 11/029,672

(22) Filed: Jan. 6, 2005

(65) Prior Publication Data

US 2005/0170774 A1 Aug. 4, 2005

(30) Foreign Application Priority Data

Jan. 9, 2004 (JP) .............................. 2004-003963

(51) Int. Cl.
*H04B 7/00* (2006.01)

(52) U.S. Cl. ..................................... 455/41.2; 455/41.3

(58) Field of Classification Search ................ 455/11.1, 455/418, 552.1, 453, 41.2, 41.3; 370/315, 370/327, 331, 338, 328

See application file for complete search history.

(56) References Cited

U.S. PATENT DOCUMENTS

| 5,537,460 | A | * | 7/1996 | Holliday et al. .......... 455/435.1 |
| 5,960,344 | A | * | 9/1999 | Mahany .................... 455/432.2 |
| 6,175,739 | B1 | * | 1/2001 | Ishii et al. ................. 455/452.1 |
| 6,560,208 | B1 | * | 5/2003 | Takahari ..................... 370/327 |
| 6,714,799 | B1 | * | 3/2004 | Park et al. .................... 455/558 |
| 6,771,962 | B2 | * | 8/2004 | Saifullah et al. ............. 455/436 |
| 6,782,260 | B2 |   | 8/2004 | Nakakita |
| 6,850,499 | B2 | * | 2/2005 | Wheatley et al. ............ 370/328 |
| 7,174,157 | B2 |   | 2/2007 | Gassho et al. |
| 7,206,840 | B2 | * | 4/2007 | Choi et al. ................... 709/225 |
| 7,324,805 | B2 |   | 1/2008 | Nakakita |
| 7,356,011 | B1 | * | 4/2008 | Waters et al. ................ 370/338 |
| 2002/0054345 | A1 | * | 5/2002 | Tomida et al. ............. 358/1.15 |
| 2005/0059379 | A1 | * | 3/2005 | Sovio et al. .................. 455/411 |

FOREIGN PATENT DOCUMENTS

| JP | 9-18956 A | 1/1997 |
| JP | 2001-298773 A | 10/2001 |
| JP | 2002-159053 A | 5/2002 |
| JP | 2003-152735 | 5/2003 |
| JP | 2003-283506 A | 10/2003 |
| JP | 2003-338821 | 11/2003 |

* cited by examiner

*Primary Examiner*—Lana N Le
*Assistant Examiner*—Ping Y Hsieh
(74) *Attorney, Agent, or Firm*—Sughrue Mion, PLLC

(57) ABSTRACT

A relay station 200 constructs an infrastructure wireless network 200L. A printing device 100 requests new participation in the wireless network 200L. When preset conditions are satisfied, for example, when the user has pressed a push button 201 provided on the relay station 200, the relay station 200 establishes temporary wireless communication with the printing device 100 and changes an SSID of the printing device 100 to an SSID of the relay station 200. In this manner, this arrangement readily changes the configuration information of the printing device 100.

7 Claims, 3 Drawing Sheets

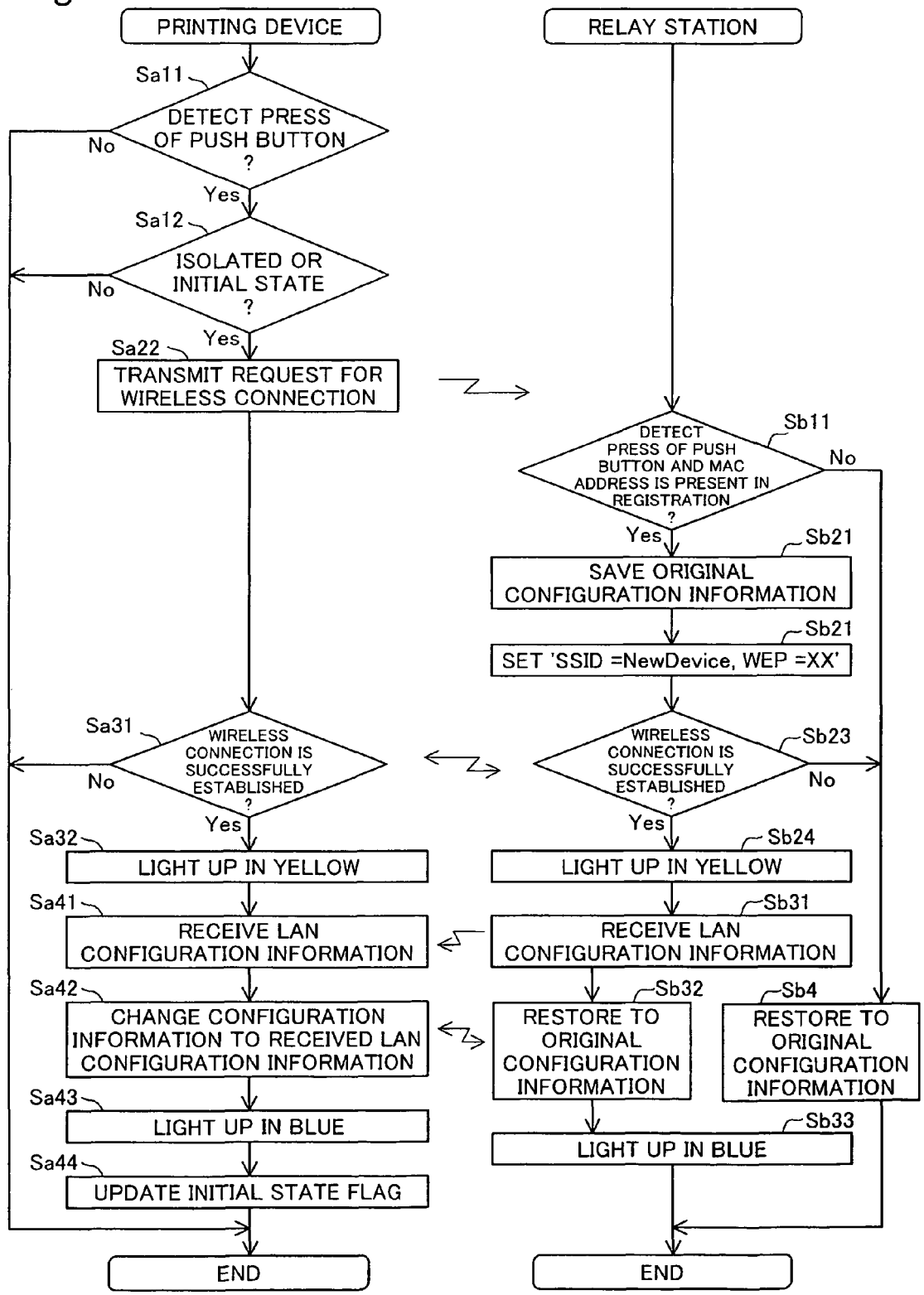

METHOD OF SETTING WIRELESS COMMUNICATION DEVICE

BACKGROUND OF THE INVENTION

1. Field of the Invention

The present invention relates to a technique of setting a wireless communication device to establish wireless communication.

2. Description of the Related Art

Various forms of wireless communication are widely used for data transmission between information processing devices. The typically available form of wireless communication is a wireless LAN (Local Area Network) in conformity with the IEEE 802.11 standard as disclosed in, for example, Japanese Patent Laid-Open Gazette No. 2003-283506. General requirement for wireless communication is common settings in communication devices that establish communication. For example, in an infrastructure wireless LAN, an SSID (Service Set Identifier) and an encryption key of WEP (Wired Equivalent Privacy) are commonly set to respective communication devices functioning as stations and access points. In an Ad Hoc wireless LAN, a channel and an encryption key of WEP are commonly set to the respective communication devices. When there is a request for participation of a new communication device in the wireless LAN, the user is required to change the settings in the new communication device to the settings for the wireless LAN.

The operation of setting the new communication device is generally time and labor consuming. It is especially troublesome to set a communication device with poor operational performances of a user interface, for example, a printing device with wireless communication functions. The general procedure connects the printing device with a personal computer (PC) and sets the printing device through operations of the PC. Wire communication between the printing device and the PC may be made, for example, via a USB cable. Wireless communication between the printing device and the PC may alternatively be established by temporarily changing the settings for wireless communication in the PC to the settings in the printing device. The former method requires wire connection, while the latter method requires restoration of the original settings in the PC after setting the printing device.

SUMMARY OF THE INVENTION

The object of the invention is thus to provide a technique of readily setting a communication device to establish wireless communication.

In order to attain at least part of the above and the other related objects, the present invention is directed to a relay station that relays wireless communication between communication terminals. The relay station includes: a configuration information storage module that stores configuration information set commonly with the communication terminals to establish the wireless communication; a tentative connection module that makes temporary wireless communication with a new communication terminal, which is newly provided as a relay object, under a preset condition regardless of settings of configuration information in the new communication terminal, so as to establish a tentative connection with the new communication terminal; and a setting instruction module that sends instruction information to the new communication terminal via the established tentative connection to change configuration information set in the new communication terminal based on the instruction information.

The relay station of the invention enables the new communication terminal to set the configuration information for wireless communication, in response to the received instruction information. This arrangement desirably relieves the user's load of setting the new communication terminal.

In one preferable embodiment of the invention, the relay station further includes an operation module that is manipulated by the user to give permission for the tentative connection. In this embodiment, the preset condition may be that the user manipulates the operation module.

The structure of this embodiment enables the user of the relay station to readily and intentionally control the tentative connection. This arrangement thus desirably prevents establishment of a tentative connection without the user's intention and accordingly reduces the potential for leakage of the configuration information set in the relay station.

In the relay station of the invention, the preset condition may be that the configuration information set in the new communication terminal is in an initial state.

The terminology 'initial state' herein means, for example, factory default setting or a reset state. This arrangement desirably prevents preset configuration information from being changed without the user's intention.

In the relay station of the invention, it is preferable that the tentative connection module establishes the tentative connection with radio wave of weaker intensity than intensity of radio wave used for the relay of the wireless communication.

This arrangement narrows the coverage of the tentative connection, thus preventing wrong setting in any unintentional communication device and leakage of configuration information.

In another preferable embodiment of the invention, the relay station further includes: an identification information storage module that stores in advance identification information inherent of each communication terminal as a relay object; and an identification information detection module that detects the identification information from a signal transmitted from the new communication terminal. In this embodiment, the preset condition may be that the detected identification information is present in the storage of the identification information storage module.

This arrangement desirably prevents potential leakage of the configuration information to any communication terminal having identification information that is not present in the storage of the identification information storage module of the relay device.

In still another preferable embodiment of the invention, the relay station further includes: a configuration information detection module that detects the configuration information of the new communication terminal from a signal transmitted from the new communication terminal. The tentative connection module temporarily rewrites the storage of the configuration information storage module with the detected configuration information to establish the tentative connection.

This arrangement temporarily changes the settings in the relay station to the settings in the new communication terminal to establish the tentative connection.

The relay station of the invention may further include a notification module that notifies the user of successful establishment of the tentative connection or of transmission of the instruction information. Such notification calls the user's attention to the potential for leakage of the configuration information via the tentative connection.

In the relay station of the invention, the configuration information includes an encryption key used for the wireless communication.

The principle of the invention is not restricted to the configuration of the relay station discussed above, but is also actualized by a communication device that makes wireless communication. The terminology 'communication device' in the specification hereof includes the relay station discussed above and a communication terminal.

The present invention is accordingly directed to a communication device that includes: a configuration information storage module that stores configuration information set commonly with another communication device to establish the wireless communication; a tentative connection module that makes temporary wireless communication with the another communication device under a preset condition regardless of settings of configuration information in the another communication device, so as to establish a tentative connection with the another communication device; a configuration information acquisition module that acquires the configuration information set in the another communication device via the established tentative connection; and an update module that updates the configuration information stored in the configuration information storage module, based on the acquired configuration information.

The tentative connection is utilized to readily change the settings in the communication device of the invention to the settings in another communication device.

In one preferable embodiment of the communication device of the invention, the tentative connection module establishes the tentative connection, when there is no other communication device that is capable of making wireless communication based on the configuration information stored in the configuration information storage module, that is, when the communication device is isolated from another communication device. This arrangement desirably prevents preset configuration information from being changed without the user's intention.

The diverse arrangements described above with regard to the relay station are also applicable to the communication device of the invention. The technique of the invention is not restricted to the relay station or the communication device described above, but is also applicable to a communication system including the relay station and the communication terminal. The invention is actualized by diversity of other applications, which include a control method of a communication device, a computer program that actualizes the control method, a recording medium with the computer program recorded therein, and a data signal that includes the computer program and is embodied in carrier waves.

Available examples of the recording medium include flexible disks, CD-ROMs, magneto-optical disks, IC cards, ROM cartridges, punched cards, prints with barcodes or other codes printed thereon, internal storage devices (memories like RAMs and ROMs) and external storage devices of the computer, and diversity of other computer readable media.

These and other objects, features, aspects, and advantages of the present invention will become more apparent from the following detailed description of the preferred embodiment with the accompanied drawings.

BRIEF DESCRIPTION OF THE DRAWINGS

FIG. 3 is a flowchart showing a series of processing routine executed by the printing device and the relay station in the communication system of FIG. 1.

DESCRIPTION OF THE PREFERRED EMBODIMENTS

Figure 1:
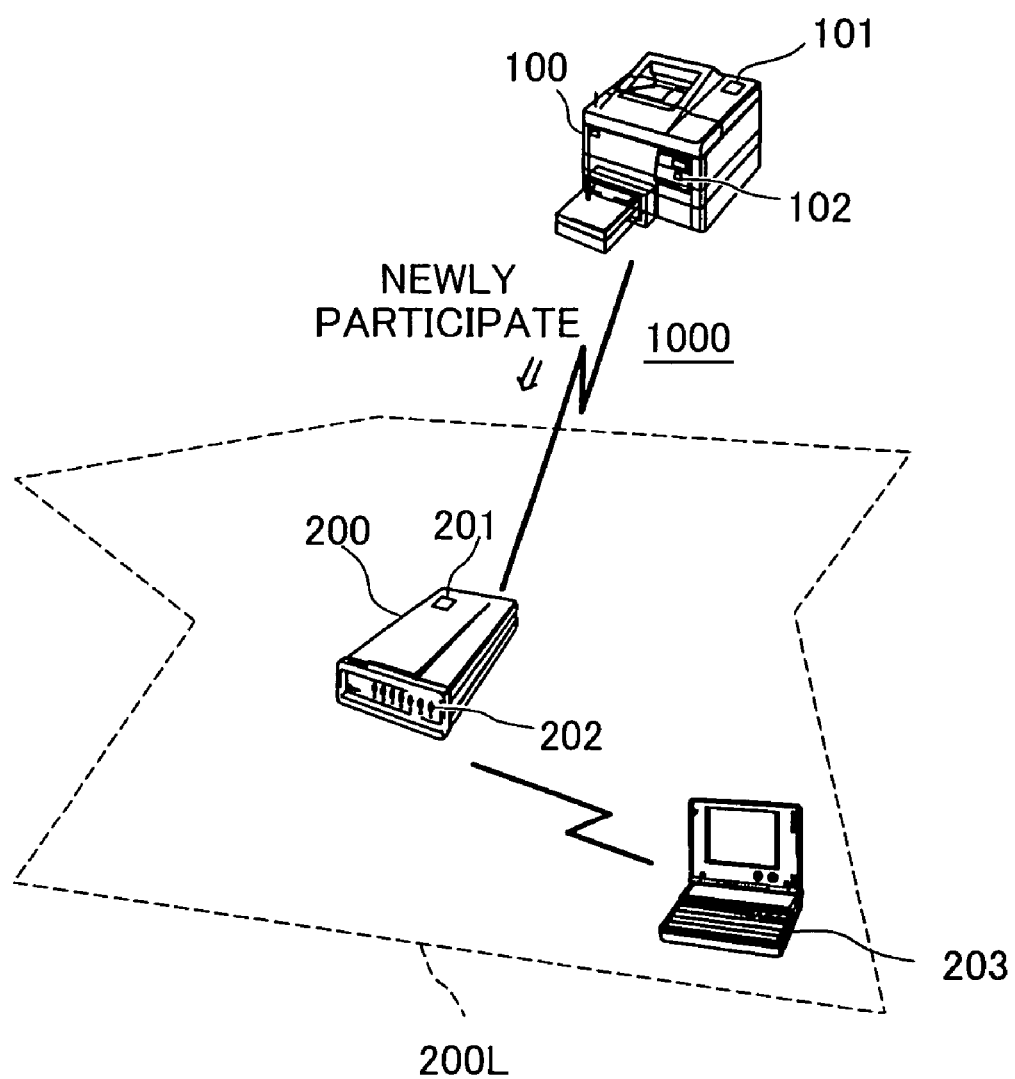
FIG. 1 schematically illustrates the configuration of a communication system.

One mode of carrying out the invention is discussed below as a preferred embodiment in the following sequence:
A. General Configuration
B. Structure of Functional Blocks
C. Setting Process for Wireless Communication
D. Modifications A. General Configuration FIG. 1 schematically illustrates the configuration of a communication system 1000 including a printing device 100 and a relay station 200. The relay station 200 is an access point of an infrastructure wireless LAN (Local Area Network) or wireless network 200L. A personal computer (PC) 203 participates as one station in this wireless network 200L. Both the relay station 200 and the PC 203 have configuration information including an SSID (Service Set Identifier) and an encryption key of WEP (Wired Equivalent Privacy) to establish wireless communication in the wireless network 200L. In the description hereafter, this configuration information is referred to as 'LAN configuration information'.

The printing device 100 with wireless communication functions is newly connected to the wireless network 200L. In the initial state, the printing device 100 does not have the LAN configuration information. The technique of this embodiment temporarily changes the settings of the relay station 200 from the LAN configuration information to establish wireless communication with the printing device 100 and then sets the LAN configuration information in the printing device 100.

The relay station 200 and the printing device 100 respectively have push buttons 201 and 101 and indicator lamps 202 and 102 as user interfaces used for the settings. The indicator lamps 202 and 102 are lit in yellow or in blue.

B. Structure of Functional Blocks

Figure 2:
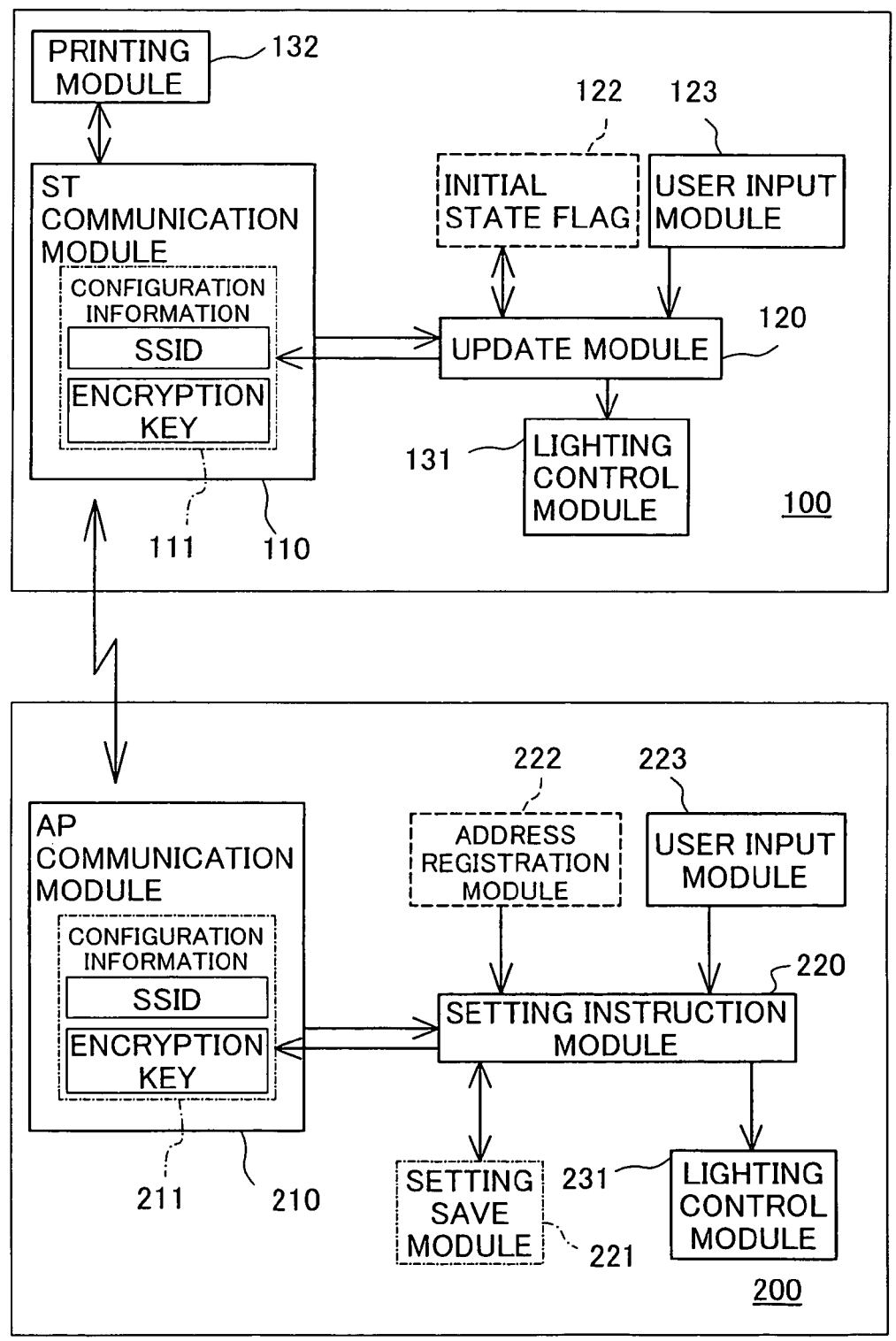
FIG. 2 is a block diagram showing functional blocks of a printing device and a relay station included in the communication system of FIG. 1.

FIG. 2 is a block diagram showing functional blocks of the printing device 100 and the relay station 200. The upper half shows the functional blocks of the printing device 100, while the lower half shows the functional blocks of the relay station 200. The printing device 100 and the relay station 200 respectively include a computer having a CPU, a ROM, and a RAM as a built-in control device. The respective functional blocks are actualized as the software configuration by installation of specific firmware in the control devices of the printing device 100 and the relay station 200. Part or all of the functional blocks may alternatively be actualized by the hardware configuration.

B1. Functional Blocks of Printing Device 100

The printing device 100 includes a functional block that is involved in the function of printing each print job and functional blocks that are involved in the function of establishing wireless communication. A printing module 132 functions to receive a print job and control the respective elements of the printing device 100 for execution of a printing operation. The other functional blocks are involved in the function of establishing wireless communication.

An ST communication module 110 functions to make communication as an infrastructure wireless LAN station. The ST communication module 110 stores configuration information 111, which includes an SSID and an encryption key and is used to establish wireless communication. The ST communication module 110 basically establishes wireless communication with only a communication device that has configuration information identical with the configuration information 111.

An update module 120 functions to automatically set the configuration information 111. In the structure of this embodiment, the update module 120 establishes a tentative connection with the relay station 200, based on configuration information different from the LAN configuration information, and utilizes information sent from the relay station 200 via the established tentative connection to set the configuration information 111 in the ST communication module 110. A lighting control module 131 controls the lighting condition of the indicator lamp 102 to express the processing status of the update module 120.

The tentative connection is established only under preset conditions (hereafter referred to as 'tentative connection conditions') discussed later. The update module 120 checks the setting of an initial state flag 122 and information obtained by a user input module 123 and determines whether the tentative connection conditions are fulfilled. The initial state flag 122 shows that the configuration information 111 is factory default setting or is reset. The user input module 123 detects a press of the push button 101 (see FIG. 1).

When the tentative connection conditions are fulfilled, the update module 120 outputs a control signal (hereafter referred to as 'tentative connection signal') to the ST communication module 110 to establish wireless communication regardless of the contents of the configuration information 111. The tentative connection signal also works to weaken the intensity of the radio wave used by the ST communication module 110. In response to reception of the tentative connection signal, the ST communication module 110 establishes a tentative connection with the radio wave of the weaker intensity than the intensity of the standard radio wave used for general wireless communication.

B2. Functional Blocks of Relay Station 200

An AP communication module 210 included in the relay station 200 functions to make communication as an access point of the infrastructure wireless LAN. The AP communication module 210 stores configuration information 211, which includes an SSID and an encryption key and is used to establish wireless communication. The AP communication module 210 basically establishes wireless communication with only a communication device that has configuration information identical with the configuration information 211.

A setting instruction module 220 outputs a control signal (hereafter referred to as 'tentative connection signal') to the AP communication module 210 to temporarily change the configuration information 211 and establish a tentative connection with the printing device 100 for setting the printing device 100. The original configuration information 211 prior to the temporary change is kept in a setting save module 221. The tentative connection signal also works to weaken the intensity of the radio wave used by the AP communication module 210. In response to reception of the tentative connection signal, the AT communication module 210 establishes a tentative connection with the radio wave of the weaker intensity than the intensity of the standard radio wave used for general wireless communication. The setting instruction module 220 sets the configuration information 211 into the printing device 100 via the established tentative connection. A lighting control module 231 controls the lighting condition of the indicator lamp 202 according to the processing status of setting.

The tentative connection is established only under preset conditions (hereafter referred to as 'tentative connection conditions') discussed later. The setting instruction module 220 determines whether the tentative connection conditions are fulfilled, based on information from an address registration module 222 and a user input module 223. The address registration module 222 is constructed as a table of registering a MAC (Media Access Control) address of each station participating in the wireless network 200L.

C. Setting Process for Wireless Communication

FIG. 3 is a flowchart showing a series of processing routine executed by the printing device 100 and the relay station 200. The left flow shows the processing routine executed by the printing device 100, while the right flow shows the processing routine executed by the relay station 200.

The printing device 100 first detects a press of the push button 101 provided on the printing device 100 for a conditional judgment of requirement or non-requirement of a new participation (step Sa11). In the case of no detection of a press of the push button 101, the printing device 100 determines non-requirement of a new participation and immediately exits from this processing routine.

In the case of detection of a press of the push button 101, on the other hand, it is determined whether the printing device 100 is in either of the isolated state and the initial state (step Sa12). The terminology 'initial state' herein means absence of any communication device that is capable of establishing communication with the configuration information 111. When the printing device 100 is not in the isolated state nor in the initial state (in response to a negative answer at step Sa12), the printing device 100 determines that setting in the printing device 100 has been concluded for wireless communication and immediately exits from this processing routine.

When the printing device 100 is in either of the isolated state and the initial state (in response to an affirmative answer at step Sa12), on the other hand, the printing device 100 changes the configuration information 111 to newly participate in the wireless network 200L. The printing device 100 first transmits a beacon as a request for a wireless connection (step Sa22). The beacon includes the configuration information 111 and a MAC address of the printing device 100.

In response to reception of the beacon, the relay station 200 starts the right flow of the processing routine shown in FIG. 3. The relay station 200 first determines whether permission is given to establish a tentative connection with the printing device 100 (step Sb11). The procedure of this embodiment gives permission for establishment of a tentative connection only when both conditions are satisfied, that is, when the user has pressed the push button 201 of the relay station 200 and when the MAC address of the printing device 100 is present in registration of the address registration module 222.

When the tentative connection conditions are satisfied, the relay station 200 establishes a tentative connection with the printing device 100 according to the following procedure. The relay station 200 first saves the original configuration information 211 into the setting save module 221 (step Sb21) and changes the configuration information 211 to the configuration information 111 of the printing device 100 (step Sb22). In the illustrated example, the configuration information 111 of the printing device 100 is 'SSID=NewDevice, WEP=XX'. The configuration information 111 of the printing device 100 is included in the beacon transmitted from the printing device 100 as mentioned above. The relay station 200 extracts the configuration information 111 from the received beacon and implements the processing of step Sb22.

The configuration information 211 of the relay station 200 is changed to the configuration information 111 of the printing device 100 and thus becomes identical with the configuration information 111 of the printing device 100. A temporary wireless connection is accordingly established between the relay station 200 and the printing device 100 (steps Sb23 and Sa31). When it is determined at step Sb23 that no tentative connection is established in a predetermined time period after the change of the configuration information 211 to the configuration information 111 (step Sb22), the relay station 200 restores the changed configuration information 211 of the relay station 200 to the original configuration information 211 or the LAN configuration information of the wireless network 200L (step Sb4), before exiting from this processing routine. When it is determined at step Sa31 that no tentative connection is established in the predetermined time period after transmission of the request for a wireless connection (step Sa22), the printing device 100 exits from this processing routine.

On establishment of the tentative connection, the relay station 200 and the printing device 100 light up the respective indicators lamps 202 and 102 in yellow (steps Sb24 and Sa32). In this state, the relay station 200 sends the LAN configuration information to the printing device 100 via the established tentative connection (step Sb31). The printing device 100 receives the LAN configuration information (step Sa41) and changes the configuration information 111 to the received LAN configuration information (step Sa42).

After transmission of the LAN configuration information at step Sb31, the relay station 200 restores the changed configuration information 211 to the original configuration information 211 or the LAN configuration information (step Sb32). Setting the LAN configuration information in both the printing device 100 and the relay station 200 establishes a wireless connection between the printing device 100 and the relay station 200.

After setting the LAN configuration information, the relay station 200 and the printing device 100 light up the respective indicator lamps 202 and 102 in blue (steps Sb33 and Sa43). The printing device 100 updates the initial state flag 122 to express the non-initial state (step Sa44).

As described above, the communication system 1000 readily sets the LAN configuration information into the printing device 100.

The indicator lamps 102 and 202 of the printing device 100 and the relay station 200 inform the user of the completed change of the configuration information. The yellow light during the tentative connection for changing the configuration information calls the user's attention to potential leakage of the configuration information.

The user manipulates the push button 201 provided on the relay station 200 to selectively control permission or prohibition of a tentative connection. This arrangement desirably prevents potential leakage of the configuration information 211 set in the relay station 200 without the user's intention. The user's manipulation of the push button 101 provided on the printing device 100 restrains change of the configuration information 111 set in the printing device 100 without the user's intention.

The printing device 100 and the relay station 200 establish the tentative connection with the radio wave of the relatively weak intensity. This arrangement desirably restrains leakage of the configuration information.

D. Modifications

The procedure of the embodiment changes the settings of the relay station 200 to establish a tentative connection. One possible modification may establish a tentative connection while maintaining the settings of the configuration information set in the relay station 200 and in the printing device 100. The modified procedure controls the ST communication module 110 and the AP communication module 210 to establish wireless communication, regardless of the identical match or mismatch of the settings of the configuration information. Such modification does not require the processing of steps Sb21, Sb22, Sb32, and Sb4 in the flowchart of FIG. 3 and thus further simplifies the setting process for wireless communication.

The tentative connection conditions (steps Sa11, Sa12, Sb11, and Sb21 in the flowchart of FIG. 3) may partly be omitted or may be combined with other conditions.

The procedure of the embodiment changes the configuration information 111 set in the printing device 100. The relay station 200 may also work to change configuration information set in another relay station. The technique of the invention is also applicable to channel setting in the process of establishing a wireless connection in an Ad Hoc wireless LAN.

The relay station and the communication device of the invention are described above with reference to the preferred embodiment. This embodiment and its modified examples discussed above are, however, to be considered in all aspects as illustrative and not restrictive. There may be many modifications, changes, and alterations without departing from the scope or spirit of the main characteristics of the present invention.

All changes within the meaning and range of equivalency of the claims are intended to be embraced therein. The scope and spirit of the present invention are indicated by the appended claims, rather than by the foregoing description.

What is claimed is:

1. A communication device that makes wireless communication, the communication device comprising:
   a configuration information storage module that stores configuration information set commonly with another communication device to establish the wireless communication;
   a tentative connection module that makes temporary wireless communication with the another communication device under a preset condition regardless of settings of configuration information in the another communication device, so as to establish a tentative connection with the another communication device;
   a configuration information acquisition module that acquires the configuration information set in the another communication device via the established tentative connection; and
   an update module that updates the configuration information stored in the configuration information storage module, based on the acquired configuration information;
   wherein the tentative connection module establishes the tentative connection with radio waves of a weaker intensity than an intensity of radio waves used for general wireless communication that is wireless communication between the communication device and the another communication device other than the temporary wireless communication.

2. The communication device in accordance with claim 1, wherein the tentative connection module establishes the tentative connection when there is no other communication device that is capable of making wireless communication based on the configuration information stored in the configuration information storage module.

3. The communication device in accordance with claim 1, wherein
the tentative connection module establishes the tentative connection when the storage of the configuration information storage module is in an initial state.

4. The communication device in accordance with claim 1, the communication device further comprising:
an operation module that is manipulated by a user to give permission for the tentative connection,
wherein the preset condition is that the user manipulates the operation module.

5. The communication device in accordance with claim 1, the communication device further comprising
a notification module that notifies a user of successful establishment of the tentative connection.

6. A control method of a communication device that makes wireless communication, the control method comprising the steps of:
 (a) storing configuration information used for establishment of wireless communication; and
 (b) establishing wireless communication with another communication device having configuration information that is identical with the stored configuration information,
the step (a) comprising the steps of
 (a1) making temporary wireless communication with the another communication device under a preset condition regardless of settings of configuration information in the another communication device, so as to establish a tentative connection with the another communication device;
 (a2) acquiring the configuration information set in the another communication device via the established tentative connection; and
 (a3) storing the acquired configuration information;
wherein the tentative connection is established with radio waves of a weaker intensity than an intensity of radio waves used for general wireless communication that is wireless communication between the communication device and the another communication device other than the temporary wireless communication.

7. A computer readable recording medium storing instructions for causing a computer executing the instructions to perform a control method of a communication device that makes wireless communication, the computer instructions comprising:
a first program code of storing configuration information used for establishment of wireless communication;
a second program code of establishing wireless communication with another communication device having configuration information that is identical with the stored configuration information; and
the first program code comprising:
a program code of making temporary wireless communication with the another communication device under a preset condition regardless of settings of configuration information in the another communication device, so as to establish a tentative connection with the another communication device;
a program code of acquiring the configuration information set in the another communication device via the established tentative connection; and a program code of storing the acquired configuration information;
wherein the tentative connection is established with radio wave of a weaker intensity than an intensity of radio waves used for general wireless communication that is wireless communication between the communication device and the another communication device other than the temporary wireless communication.

\* \* \* \* \*